US011491899B2

(12) United States Patent
Schulz et al.

(10) Patent No.: US 11,491,899 B2
(45) Date of Patent: Nov. 8, 2022

(54) VEHICLE SEAT TRIM MEMBER AND ASSEMBLY

(71) Applicant: Lear Corporation, Southfield, MI (US)

(72) Inventors: Laura Schulz, Bloomfield Hills, MI (US); Julian Svaighert, Southfield, MI (US)

(73) Assignee: Lear Corporation, Southfield, MI (US)

( * ) Notice: Subject to any disclaimer, the term of this patent is extended or adjusted under 35 U.S.C. 154(b) by 58 days.

(21) Appl. No.: 17/128,556

(22) Filed: Dec. 21, 2020

(65) Prior Publication Data

US 2022/0194275 A1 Jun. 23, 2022

(51) Int. Cl.
*B60N 2/58* (2006.01)
*B60N 2/874* (2018.01)
*B60N 2/897* (2018.01)

(52) U.S. Cl.
CPC .......... *B60N 2/5883* (2013.01); *B60N 2/874* (2018.02); *B60N 2/897* (2018.02)

(58) Field of Classification Search
CPC ........ B60N 2/58; B60N 2/5883; B60N 2/874; B60N 2/897
See application file for complete search history.

(56) References Cited

U.S. PATENT DOCUMENTS

| | | | | |
|---|---|---|---|---|
| 6,527,344 B2* | 3/2003 | Takei | ............... | B60N 2/838 264/46.7 |
| 7,703,855 B1* | 4/2010 | Kalinowski | ............ | B60N 2/809 297/452.6 |
| 10,099,586 B2* | 10/2018 | Ito | ........................ | B68G 7/05 |
| 10,358,054 B2* | 7/2019 | Durkee | ................. | B60N 2/643 |
| 10,549,667 B1* | 2/2020 | Murley | ................... | B60N 2/58 |
| 10,611,276 B2* | 4/2020 | Suzuki | ................. | B60N 2/5883 |
| 2019/0176664 A1* | 6/2019 | Walser | ................. | B60N 2/5891 |

FOREIGN PATENT DOCUMENTS

| | | |
|---|---|---|
| DE | 7417218 U | 9/1974 |
| JP | 3372010 B2 | 1/2003 |
| JP | 2007301081 A | 11/2007 |
| KR | 20120000864 U * | 2/2012 |

* cited by examiner

*Primary Examiner* — Philip F Gabler
(74) *Attorney, Agent, or Firm* — Brooks Kushman P.C.

(57) ABSTRACT

A vehicle seat trim assembly for concealing a vehicle seat frame is provided with at least two adjacent panels, which are oriented at angles relative to each other. At least one slot extends through the at least two adjacent panels. An interior lining is formed from a flexible nonwoven fabric material and sewn within the at least one slot. The interior lining includes a slot with a width smaller than the width of the at least one slot in the at least two adjacent panels to enclose the slot in the at least two adjacent panels and to deform to provide clearance for a head restraint post. An embroidered seam is sewn into the vehicle seat trim member around the at least one slot and sewn into the interior lining to attach the interior lining to the at least two adjacent panels.

16 Claims, 4 Drawing Sheets

VEHICLE SEAT TRIM MEMBER AND ASSEMBLY

TECHNICAL FIELD

Various embodiments are related to vehicle seat trim members and vehicle seat trim assemblies.

BACKGROUND

Vehicle seat trim assemblies are provided with vehicle seat trim members to conceal an underlying frame and components of a vehicle seat assembly. Vehicle seat assemblies are provided with a head restraint assembly, which may be adjustable relative to the seat assembly.

SUMMARY

According to an embodiment, a vehicle seat trim member is adapted to be attached to a vehicle seat frame to conceal the frame. The vehicle seat trim member is provided with at least two adjacent panels, which are oriented at angles relative to each other. One of the at least two adjacent panels extends across a lateral width of the frame. Another one of the at least two adjacent panels extends less than the lateral width of the frame. At least one slot extends through the at least two adjacent panels.

According to a further embodiment, the at least one slot is sized to receive a head restraint post through the at least one slot for translation within the at least one slot.

According to another further embodiment, the at least one slot does not intersect a deck seam.

According to another further embodiment, the vehicle seat trim member does not include a gusset in the slot.

According to another embodiment, a vehicle seat assembly is provided with a frame. A vehicle seat trim member is attached to the vehicle seat frame to conceal the frame. The vehicle seat trim member is provided with at least two adjacent panels, which are oriented at angles relative to each other. One of the at least two adjacent panels extends across a lateral width of the frame. Another one of the at least two adjacent panels extends less than the lateral width of the frame. At least one slot extends through the at least two adjacent panels.

According to a further embodiment, a head restraint post is connected to the frame to move relative to the frame, and extends through the at least one slot in the vehicle seat trim member to move within the at least one slot.

According to another further embodiment, the frame is provided with a forward support region, a top region, and a rear region. The vehicle seat trim member further provides a first panel over the top region of the frame, and an upright panel over the forward support region or the rear region of the frame. The at least one slot is formed through the first panel and the upright panel.

According to another further embodiment, the upright panel is a rearward panel over the rear region of the frame.

According to another further embodiment, the vehicle seat trim member is further provided with a third panel adjacent to the first panel or the upright panel. A deck seam is sewn along an intersection of the third panel and the first panel or the upright panel.

According to another embodiment, a vehicle seat trim assembly is provided with a vehicle seat trim member adapted to be attached to a vehicle seat frame to conceal the frame. The vehicle seat trim member is provided with at least two adjacent panels, which are oriented at angles relative to each other. One of the at least two adjacent panels extends across a lateral width of the frame. Another one of the at least two adjacent panels extends less than the lateral width of the frame. At least one slot extends through the at least two adjacent panels. The at least one slot has a width. An interior lining is sewn within the at least one slot. The interior lining includes a slot with a width smaller than the width of the at least one slot in the vehicle seat trim member.

According to a further embodiment, the vehicle seat trim member is formed from cloth, leather, or a polymeric fabric. The interior lining is formed from a fabric.

According to an even further embodiment, the interior lining is formed from a nonwoven fabric.

According to another further embodiment, the interior lining is formed from a flexible material.

According to another further embodiment, a seam is sewn into the vehicle seat trim member around the at least one slot and sewn into the interior lining to attach the interior lining to the vehicle seat trim member.

According to an even further embodiment, the seam is embroidered and exposed on an exterior side of the vehicle seat trim member.

According to another embodiment, a vehicle seat assembly is provided with a frame. A vehicle seat trim assembly is provided with a vehicle seat trim member adapted to be attached to the vehicle seat frame to conceal the frame. The vehicle seat trim member is provided with at least two adjacent panels, which are oriented at angles relative to each other. One of the at least two adjacent panels extends across a lateral width of the frame. Another one of the at least two adjacent panels extends less than the lateral width of the frame. At least one slot extends through the at least two adjacent panels. The at least one slot has a width. An interior lining is sewn within the at least one slot. The interior lining includes a slot with a width smaller than the width of the at least one slot in the vehicle seat trim member. A head restraint post is provided with a width greater than the width of the slot in the interior lining. The head restraint post is connected to the frame to move relative to the frame, and extends through the at least one slot in the vehicle seat trim member and through the at least one slot in the interior lining to move within the at least one slot.

According to another embodiment, a vehicle seat trim assembly is adapted to be attached to a vehicle seat frame to conceal the frame. The vehicle seat trim assembly is provided with at least two adjacent panels, which are oriented at angles relative to each other. At least one slot extends through the at least two adjacent panels. An interior lining is formed from a flexible nonwoven fabric material and sewn within the at least one slot. The interior lining includes a slot with a width smaller than the width of the at least one slot in the at least two adjacent panels to enclose the slot in the at least two adjacent panels and to deform to provide clearance for a head restraint post. An embroidered seam is sewn into the at least two adjacent panels around the at least one slot and sewn into the interior lining to attach the interior lining to the at least two adjacent panels.

According to a further embodiment, the at least two adjacent panels do not include a gusset in the at least one slot.

According to an embodiment, a vehicle seat assembly is provided with a frame with a forward support region, a top region, and a rear region. A head restraint post is connected to the frame to move relative to the frame. The head restraint post has a width. A vehicle seat trim member is attached to the vehicle seat frame to conceal the frame. The vehicle seat trim member is provided with a first panel over the top region of the frame, and an adjacent upright panel over the forward support region or the rear region of the frame, such that the first panel and the upright panel are oriented at angles relative to each other. At least one slot extends through the first panel and the upright panel. The at least one slot has a width greater than the width of the head restraint post. The head restraint post extends through the at least one slot for translation within the at least one slot. An interior lining is formed from a flexible nonwoven fabric material and sewn within the at least one slot. The interior lining includes a slot with a width smaller than the width of the at least one slot in the vehicle seat trim member and smaller than the width of the head restraint post to enclose the slot in the vehicle seat trim member and to deform to provide clearance for the head restraint post. An embroidered seam is sewn into the vehicle seat trim member around the at least one slot and sewn into the interior lining to attach the interior lining to the vehicle seat trim member.

According to a further embodiment, the vehicle seat trim member does not include a gusset in the at least one slot.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1-4 illustrate a vehicle seat assembly 20 according to an embodiment. The seat assembly 20 is an automotive vehicle seat assembly 20. The seat assembly 20 may be provided in any vehicle, such as a mass transportation vehicle, an aircraft, a watercraft, or the like. The depicted vehicle seat assembly 20 is a rear seat assembly 20. However, any seating position or arrangement within a vehicle may employ the seat assembly 20. The seat assembly 20 is illustrated as a seat assembly 20 for a single occupant. However, the seat assembly 20 may also be employed for multiple occupants, such as a bench seat assembly, a partial seat assembly, or the like.

Figure 1:
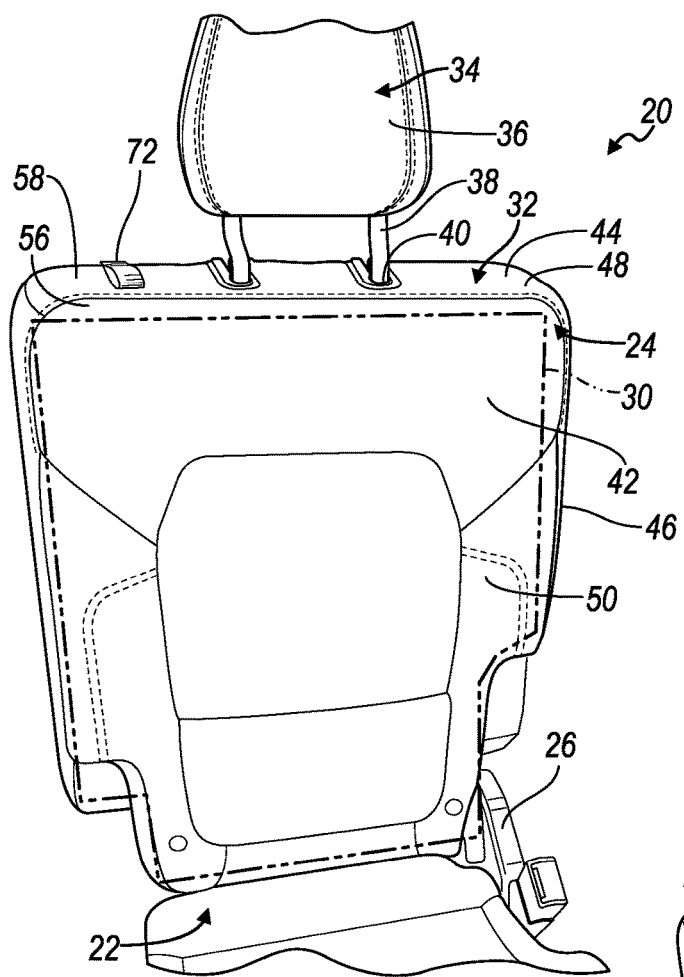
FIG. 1 is a front perspective view of a vehicle seat assembly according to an embodiment.
Figure 2:
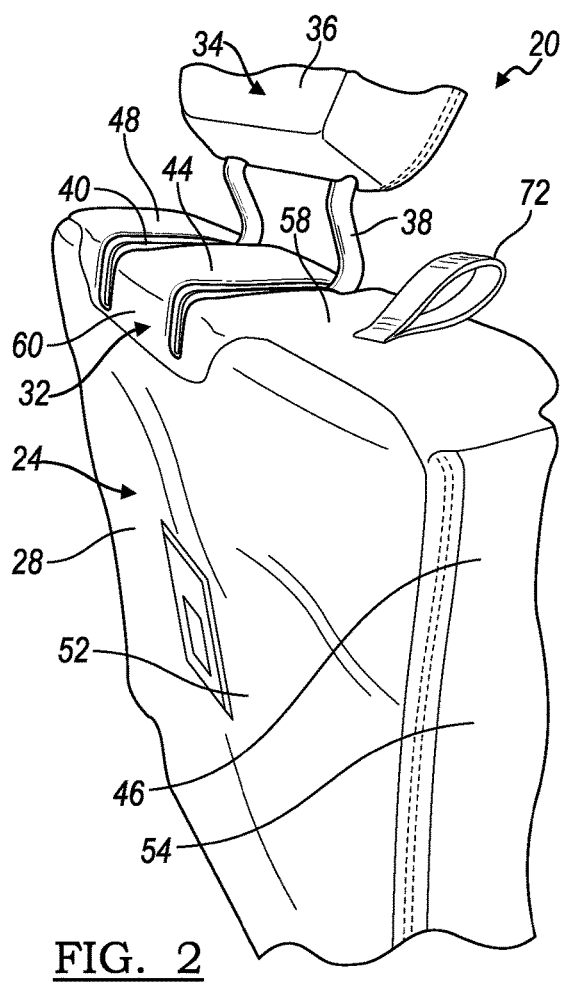
FIG. 2 is a rear side perspective view of the vehicle seat assembly of FIG. 1.
Figure 3:
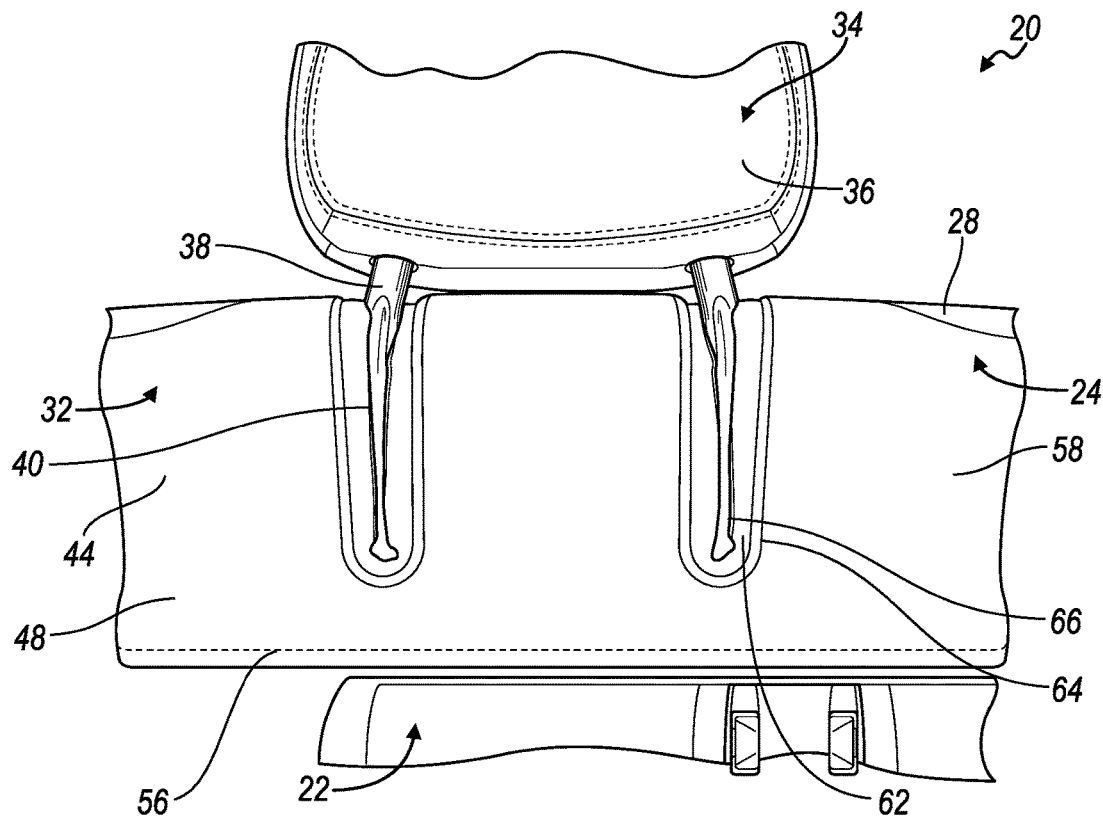
FIG. 3 is an enlarged top perspective view of the vehicle seat assembly of FIG. 1.

With reference to FIGS. 1 and 3, the seat assembly 20 includes a seat bottom 22 that is adapted to be mounted to a vehicle floor to receive a seated occupant thereupon the seat bottom 22. FIGS. 1-4 illustrate that the seat assembly 20 also includes a seatback 24 extending in an upright direction from the seat bottom 22 in a seating position to support a back of a seated occupant. In the depicted embodiment of FIG. 1, the seatback 24 is pivotally connected to the seat bottom 22 at a pivot mechanism, referred to as a recline mechanism 26. The recline mechanism 26 permits an occupant to adjust an angle of the seatback 24 relative to the seat bottom 22. The recline mechanism 26 also permits an occupant to pivot the seatback 24 toward the seat bottom 22 to fold flat to provide clearance for ingress and egress of occupants and cargo. A rear surface 28 of the seatback 24 may be utilized as a cargo load floor in a collapsed position of the seat assembly 20.

FIG. 1 schematically illustrates a frame 30 of the seatback 24. The frame 30 is formed of structurally resilient materials, such a steel stampings, polymeric molded attachments, and the like. Referring now to FIGS. 1-4, the seat assembly 20 includes a vehicle seat trim assembly 32 over the frame 30 to conceal the frame 30. Foam, cushioning, padding, massage assemblies, air bladders, lumbar mechanisms, and the like may be provided on the frame 30 and enclosed by the trim assembly 32. The trim assembly 32 includes a similar overall shape with the frame 30 with surfaces overlapping, and common to, surfaces provided by the frame 30.

The vehicle seat assembly 20 includes a head restraint assembly 34 that is supported by the seatback 24 and extends above the seatback 24, as shown in FIGS. 1 and 2, in a seating position to support a head of an occupant. The head restraint assembly 34 includes a head restraint 36 to support the head of an occupant in the seating position. The head restraint assembly 34 also includes a pair of posts 38 that are connected to the seatback frame 30 to support the head restraint 36 relative to the seatback 24.

Figure 4:
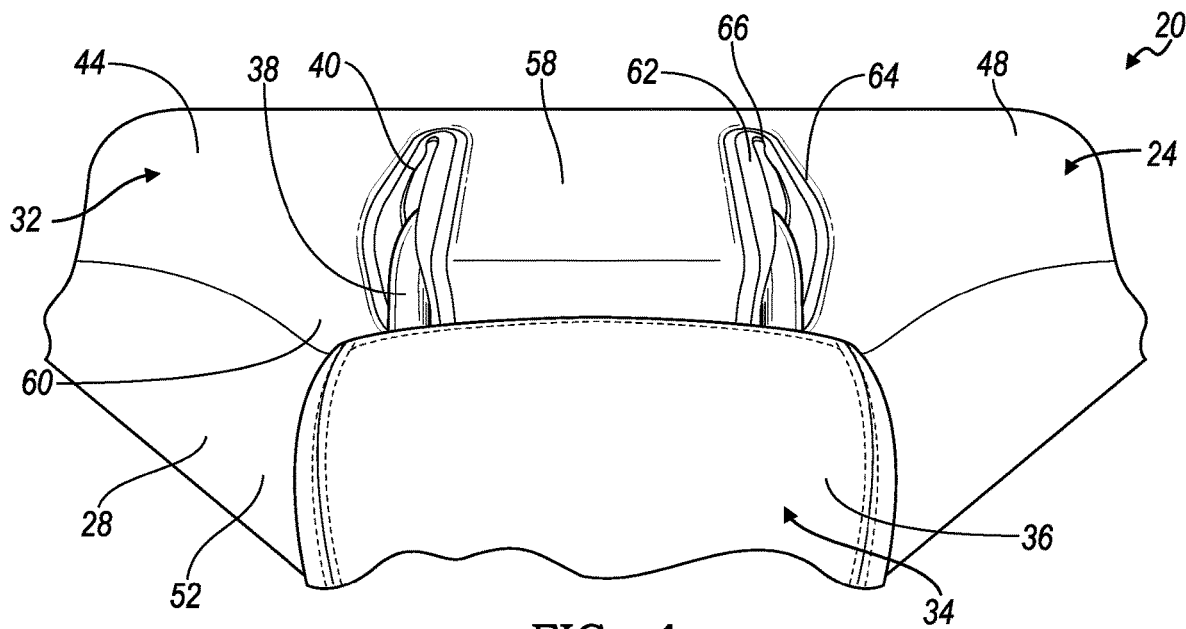
FIG. 4 is a top perspective view of the vehicle seat assembly of FIG. 1, illustrated with a head restraint in a retracted position.

The head restraint posts 38 are pivotally connected to the frame 30 to pivot the head restraint 36 toward the rear surface 28 of the seatback 24, as illustrated in FIGS. 3 and 4. The head restraint 36 is pivoted rearward when the seatback 24 is pivoted forward to provide clearance to a forward obstacle, such as a front seating row. The pivoting of the head restraint 36 improves compactness of the seat assembly 20 in the collapsed position.

The posts 38 of the head restraint assembly 34 extend through the seat trim assembly 32. Due to the pivoting of the posts 38 relative to the frame 30 and the seat trim assembly 32, a pair of slots 40 are formed through the seat trim assembly 32 to permit the posts 38 to translate through the slots 40 as the posts 38 are pivoted.

The seat trim assembly 32 includes a front support region 42 illustrated in FIG. 1 for receiving a back of the occupant and for supporting the occupant along with an underlying front support region of the frame 30. Referring to FIGS. 1-4, the seat trim assembly 32 and the frame 30 also include a top region 44. The seat trim assembly 32 and the frame 30 also include a rear region along the rear surface 28. The seat trim assembly 32 and the frame 30 also include a pair of side regions 46 in FIGS. 1 and 2.

The seat trim assembly 32 is provided by a plurality of trim members, such as an upper trim member 48, a front trim member 50, a rear trim member 52, and a pair of side trim members 54. Each of the trim members 48, 50, 52, 54 may be sewn together, fastened by an interlocking mechanical fastener, or otherwise attached together along adjacent seams. Each trim member 48, 50, 52, 54 may be formed from leather, fabric, or any suitable material. Each trim member 48, 50, 52, 54 may be formed as a single integral sheet of material, or as a plurality of interconnected panels.

The upper trim member 48 is illustrated secured to the other trim members 50, 52, 54 in FIGS. 1-4. The upper trim member 48 is also illustrated separately in FIGS. 5-7. The front trim member 50 is connected to the upper trim member 48 and the pair of side trim members 54 by a deck seam 56. The deck seam 56 includes stitching that attaches the adjacent trim members 50, 52, 54, while also providing an ornamental appearance of a border or a line of demarcation between the adjacent regions 42, 44, 46 of the seat assembly 20.

The pair of slots 40 are formed through the upper trim member 48. Due to the pivoting of the head restraint assembly 34, the posts 38 extend through the top region 44 and the rear surface 28. The slots 40 are constrained to the upper trim member 48 to avoid intersecting a seam, such as a deck seam, to avoid obfuscating ornamental stitching. The upper trim member 48 includes an upper panel 58 and an adjacent rear panel 60. The upper panel 58 is illustrated in FIGS. 1-6. The upper panel 58 extends across a lateral width of the upper region 44. The integral rear panel 60 extends from the upper panel 58 in an upright direction along the rear seat surface 28. The rear panel 60 is illustrated in FIGS. 2 and 4-6. The rear panel 60 has a lateral width that is less than the upper panel 58. The slots 40 are formed through the upper panel 58 and the rear panel 60.

The rear trim member 52 may be formed from a nonwoven, wear resistant material, such as automotive carpet to avoid cargo wear as a load surface. The rear panel 60 of the upper trim member 48 has a reduced width to permit the rear trim member to extend around the rear panel 60, to the upper panel 58.

Figure 5:
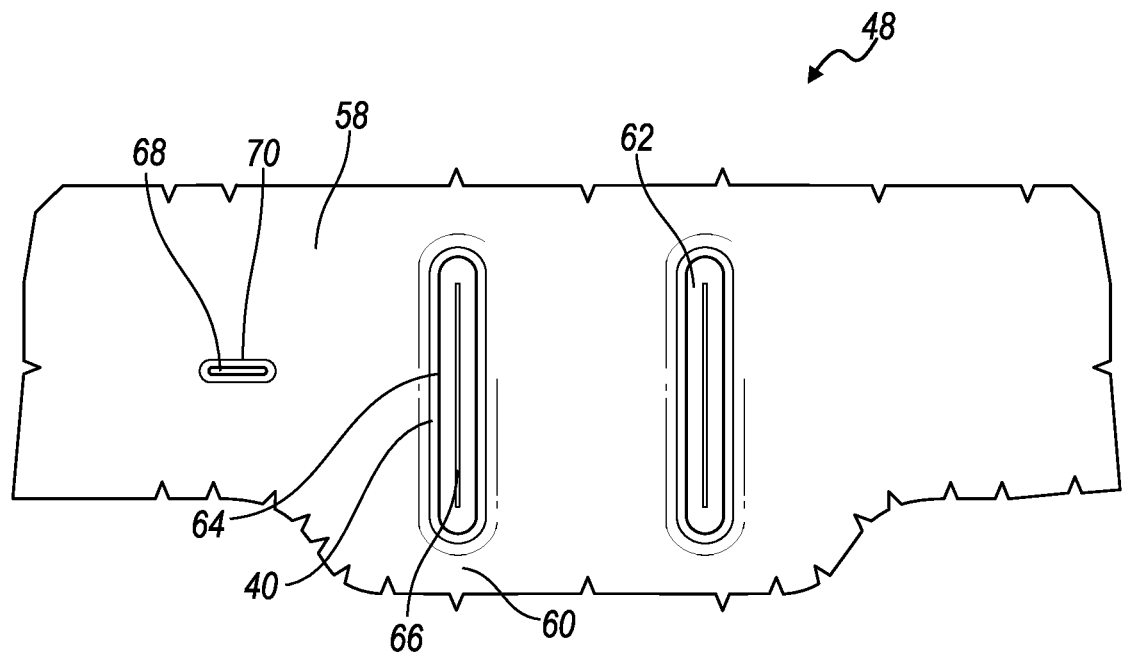
FIG. 5 is a top plan view of a vehicle seat trim assembly of the vehicle seat assembly of FIG. 1.
Figure 6:
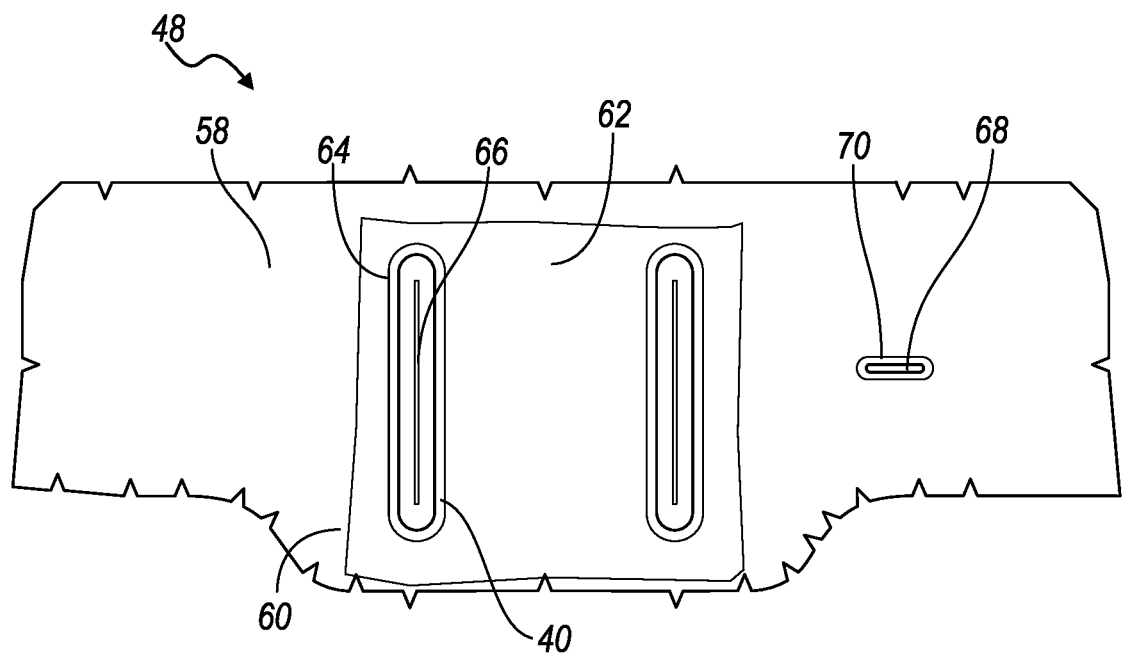
FIG. 6 is a bottom view of the vehicle seat trim assembly of FIG. 5.
Figure 7:
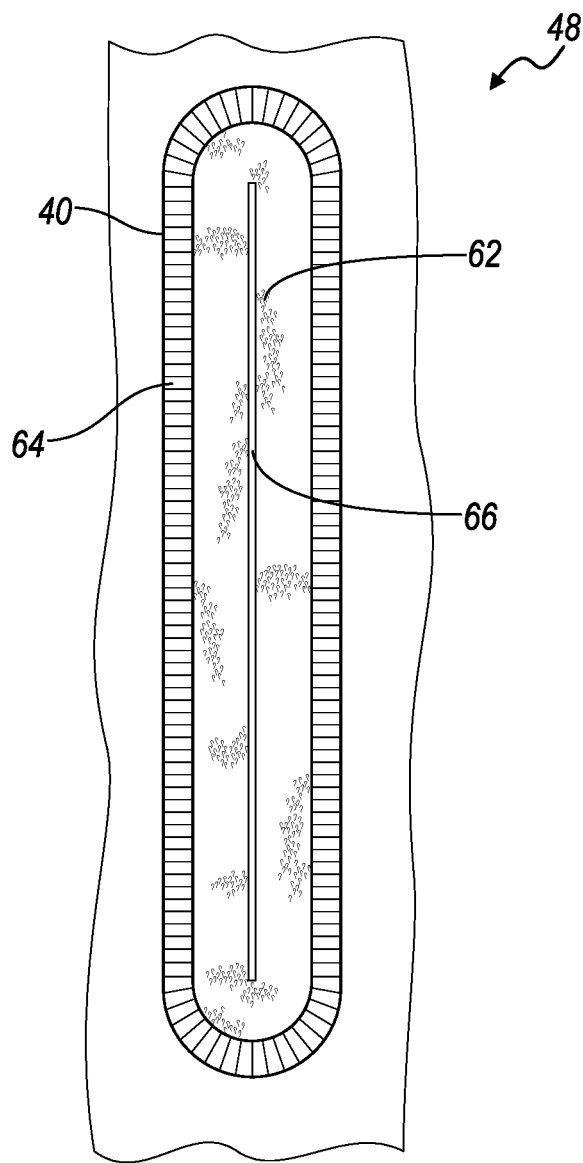
FIG. 7 is an enlarged view of a portion of the vehicle seat trim assembly of FIG. 5.

FIG. 5 depicts an external, outward surface of the upper trim member 48. FIG. 6 illustrates an internal, concealed surface of the upper trim member 48. FIG. 7 is an enlarged view of one of the slots 40 from the external view of FIG. 5. Referring to FIGS. 5-7, the slots 40 each have a width that is slightly larger than a width or diameter of one of the posts 38 to permit the posts 38 to pass freely within the slots 40.

An interior lining 62 is provided on an internal side of the upper trim member 48, overlapping the slots 40 as illustrated in FIG. 6. The interior lining 62 is formed from a flexible, nonwoven fabric, such as automotive carpet. The interior lining 62 is sewn to the upper trim member 48 by an embroidered seam 64 around a perimeter of each slot 40. The embroidered seams 64 are exposed on an external side of the upper trim member 48 to enclose a raw edge of the upper trim member 48. A pair of slots 66 are formed through the interior lining 62 and aligned with the slots 40 of the upper trim member 48. The slots 66 may be formed as a line cut or slit in the interior lining 62.

The slots 66 in the interior lining 62 have a minimal width, which is less than a width of the head restraint posts 38. Each of the head restraint posts 38 extends through the one of the slots 66. Due to the flexibility of the interior lining 62, the interior lining 62 deforms to permit the head restraint posts 38 to extend through the slots 66. Since the carpet is nonwoven, the slots 66 can be left raw and unfinished, and the slots 66 will not unravel. Likewise, the exposed edges of the slots 66 maintain an appearance of the interior lining 62 due to the nonwoven material characteristics, unlike a cut edge of leather or vinyl, that has a different color and texture. The nonwoven material of the interior lining 62 eliminates additional sewing of folding material into the slot 40, such as a gusset or the like. By eliminating a gusset, unsightly folding and wrinkles are avoided, while eliminating extra material and labor costs.

The upper trim member 48 also includes an aperture 68 with an embroidered seam 70. Referring to FIGS. 1 and 2, a strap 72 extends through the aperture 68 to actuate a release of the recline mechanism 26 to fold the seat assembly 20.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat trim member adapted to be attached to a vehicle seat frame to conceal the frame, the vehicle seat trim member comprising at least two adjacent panels, which are oriented at angles relative to each other, wherein one of the at least two adjacent panels extends across a lateral width of the frame, wherein another one of the at least two adjacent panels extends less than the lateral width of the frame, and wherein at least one slot extends through the at least two adjacent panels.

2. The vehicle seat trim member of claim 1 wherein the at least one slot is sized to receive a head restraint post through the at least one slot for translation within the at least one slot.

3. The vehicle seat trim member of claim 1 wherein the at least one slot does not intersect a deck seam.

4. The vehicle seat trim member of claim 1 wherein the vehicle seat trim member does not include a gusset in the slot.

5. A vehicle seat assembly comprising:
a frame; and
the vehicle seat trim member of claim 1.

6. The vehicle seat assembly of claim 5 further comprising a head restraint post connected to the frame to move relative to the frame, and extending through the at least one slot in the vehicle seat trim member to move within the at least one slot.

7. The vehicle seat assembly of claim 5 wherein the frame comprises a forward support region, a top region, and a rear region;
wherein the vehicle seat trim member further comprises a first panel over the top region of the frame, and an upright panel over the forward support region or the rear region of the frame; and
wherein the at least one slot is formed through the first panel and the upright panel.

8. The vehicle seat assembly of claim 7 wherein the upright panel is a rearward panel over the rear region of the frame.

9. The vehicle seat assembly of claim 7 wherein the vehicle seat trim member further comprises a third panel adjacent to the first panel or the upright panel; and
wherein the vehicle seat assembly further comprises a deck seam sewn along an intersection of the third panel and the first panel or the upright panel.

10. A vehicle seat trim assembly comprising:
the vehicle seat trim member of claim 1, wherein the at least one slot has a width; and
an interior lining sewn within the at least one slot, wherein the interior lining includes a slot with a width smaller than the width of the at least one slot in the vehicle seat trim member.

11. The vehicle seat trim assembly of claim 10 wherein the vehicle seat trim member is formed from cloth, leather, or a polymeric fabric; and wherein the interior lining is formed from a fabric.

12. The vehicle seat trim assembly of claim 11 wherein the interior lining is formed from a nonwoven fabric.

13. The vehicle seat trim assembly of claim 10 wherein the interior lining is formed from a flexible material.

14. The vehicle seat trim assembly of claim 10 further comprising a seam sewn into the vehicle seat trim member around the at least one slot and sewn into the interior lining to attach the interior lining to the vehicle seat trim member.

15. The vehicle seat trim assembly of claim 14 wherein the seam is embroidered and exposed on an exterior side of the vehicle seat trim member.

16. A vehicle seat assembly comprising:
a frame;
the vehicle seat trim assembly of claim 10; and
a head restraint post with a width greater than the width of the slot in the interior lining, the head restraint post connected to the frame to move relative to the frame, and extending through the at least one slot in the vehicle seat trim member and through the at least one slot in the interior lining to move within the at least one slot.

* * * * *